US012200459B2

(12) United States Patent
Wang et al.

(10) Patent No.: US 12,200,459 B2
(45) Date of Patent: Jan. 14, 2025

(54) VIBRATING DIAPHRAGM OF SOUND-PRODUCING APPARATUS AND SOUND-PRODUCING APPARATUS

(71) Applicant: Goertek Inc., Shandong (CN)

(72) Inventors: Shuqiang Wang, Weifang (CN); Fengguang Ling, Weifang (CN); Chun Li, Weifang (CN); Chunfa Liu, Weifang (CN)

(73) Assignee: Goertek Inc., Shandong (CN)

( * ) Notice: Subject to any disclaimer, the term of this patent is extended or adjusted under 35 U.S.C. 154(b) by 330 days.

(21) Appl. No.: 17/767,365

(22) PCT Filed: Dec. 25, 2019

(86) PCT No.: PCT/CN2019/128165

§ 371 (c)(1),
(2) Date: Apr. 7, 2022

(87) PCT Pub. No.: WO2021/082247

PCT Pub. Date: May 6, 2021

(65) Prior Publication Data

US 2022/0386030 A1 Dec. 1, 2022

(30) Foreign Application Priority Data

Oct. 31, 2019 (CN) ......................... 201911055451.4

(51) Int. Cl.
*H04R 7/02* (2006.01)
*H04R 9/06* (2006.01)

(52) U.S. Cl.
CPC ................ *H04R 7/02* (2013.01); *H04R 9/06* (2013.01)

(58) Field of Classification Search
None
See application file for complete search history.

(56) References Cited

U.S. PATENT DOCUMENTS

2002/0061953 A1* 5/2002 Takita ..................... C08L 83/08 428/483
2012/0093353 A1* 4/2012 Windischberger ....... H04R 1/22 381/396
2017/0261894 A1* 9/2017 Kinuta ................. G03G 15/206

FOREIGN PATENT DOCUMENTS

CN 1702098 A 11/2005
CN 107404685 A * 11/2017 ............. H04R 7/122
CN 109195074 A 1/2019

OTHER PUBLICATIONS

Natural Numbers | Definitions, Examples, Properties; GeeksForGeeks (Year: 2024).*

* cited by examiner

*Primary Examiner* — Ramsey Zacharia
(74) *Attorney, Agent, or Firm* — Baker Botts, LLP

(57) ABSTRACT

The present disclosure provides a vibrating diaphragm of a sound-producing apparatus and the sound-producing apparatus. The vibrating diaphragm includes a fluorosilicone rubber film layer, and the fluorosilicone rubber includes a linear polymer composed of a silica main chain and a side chain radical; a molecular structure of the polymer including a unit with the side chain radical with vinyl is a methyl vinyl siloxane unit, and a unit with the side chain radical with $R_1$ is a fluorine-containing siloxane unit; and wherein n and m are natural numbers, and $R_1$ comprises at least one of fluoroalkyl and fluoroaryl.

12 Claims, 3 Drawing Sheets

VIBRATING DIAPHRAGM OF SOUND-PRODUCING APPARATUS AND SOUND-PRODUCING APPARATUS

CROSS-REFERENCE TO RELATED APPLICATIONS

This application is a National Stage of International Application No. PCT/CN2019/28165, filed on Dec. 25, 2019, which claims priority to Chinese Patent Application No. 201911055451.4, filed on Oct. 31, 2019, both of which are hereby incorporated by reference in their entireties.

TECHNICAL FIELD

The present disclosure relates to field of acoustical-electrical conversion technologies, and in particular to a vibrating diaphragm of a sound-producing apparatus and the sound-producing apparatus.

BACKGROUND

In an electronic product, a speaker is an important component. The demand on waterproofness of electronic products is increasingly high, and the speakers therein also need to be waterproof. As such, it is necessary for an existing vibrating diaphragm of a speaker to be stable in property when stained with water, and to be able to recover after being depressed under water pressure.

As a vibrating diaphragm of a speaker is in communication with outside, it is also necessary for it to have good oil and solvent resistance property and to be stable in property after contact with oil and solvent.

Among existing speakers, most micro speakers adopt vibrating diaphragms made of engineering plastic films and silicone rubber. The vibrating diaphragm made of engineering plastic is oil-resistant, however, it is relatively low in yield strain and its corrugated rim will be depressed irreversibly under water pressure, failing to meet the demand on waterproofness. Upon contact of the silicone rubber vibrating diaphragm with oil, the modulus of the silicone rubber vibrating diaphragm will decrease rapidly, as the silicone rubber is of a dispersed molecular structure which tends to absorb oily components. Meanwhile, the mass of the vibrating diaphragm will increase, thereby influencing F0, THD and sensitivity of the vibrating diaphragm.

Accordingly, it is necessary to provide a novel technical solution to solve the above problem.

SUMMARY

An object of the present disclosure is to provide a novel technical solution of a vibrating diaphragm of a sound-producing apparatus, as well as the sound-producing apparatus.

According to a first aspect of the present disclosure, provided is a vibrating diaphragm of a sound-producing apparatus, wherein the vibrating diaphragm includes a fluorosilicone rubber film layer, and the fluorosilicone rubber includes a linear polymer composed of a silica main chain and a side chain radical;

A molecular structure of the polymer is as follows:

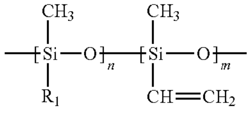

Wherein, a unit with the side chain radical with vinyl is a methyl vinyl siloxane unit, and a unit with the side chain radical with $R_1$ is a fluorine-containing siloxane unit;

And wherein n and m are natural numbers, and $R_1$ includes at least one of fluoroalkyl and fluoroaryl.

Optionally, $R_1$ includes at least one of γ-trifluoropropyl, pentafluorobutyl, heptafluoropentyl and fluorophenyl.

Optionally, an amount of methyl vinyl siloxane unit is 0 to 2 mol % of the total amount of the polymer.

Optionally, the fluorosilicone rubber further includes a vulcanizer, and the vulcanizer is at least one of oxide and hydrogen-containing silicone oil.

Optionally, the fluorosilicone rubber further includes an inorganic filler reinforcing agent, and the inorganic filler reinforcing agent includes at least one of a carbon black and a white carbon black.

Optionally, a hardness of the fluorosilicone rubber is 30 A to 85 A and a 100% stable stretch modulus of the fluorosilicone rubber at room temperature is 0.5 MPa to 50 MPa.

Optionally, an elongation at break of the fluorosilicone rubber is greater than 50%.

Optionally, the vibrating diaphragm is a single-layered vibrating diaphragm.

Optionally, the vibrating diaphragm is a compound vibrating diaphragm, and the compound vibrating diaphragm includes at least one fluorosilicone rubber film layer.

Optionally, a thickness of the vibrating diaphragm is 10 μm to 200 μm.

Optionally, the vibrating diaphragm is prepared by one of pressure forming, injection molding and blow molding.

According to another aspect of the present disclosure, provided is a sound-producing apparatus, including the vibrating diaphragm according to any one of the above, the vibrating diaphragm being configured to enable the sound-producing apparatus to generate a sound by vibration.

According to an embodiment of the present disclosure, the vibrating diaphragm made of the fluorosilicone rubber has excellent rebound resilience and good lyophobic and oil-resistance characteristics, and can maintain stable acoustic performance. The vibrating diaphragm can recover under its own resilience upon deformation, and is free from failure due to film folding, film breakage, contacting with water and oil, etc.

The exemplary embodiment of the present disclosure is described in detail with reference to the drawings, other features and advantages of the present disclosure will become clearer.

BRIEF DESCRIPTION OF THE DRAWINGS

The accompanying drawings, which are combined in and constitute a part of this specification, illustrate embodiments of the present disclosure and, together with the description, serve to explain the principles of the present disclosure.

DETAILED DESCRIPTION

Figure 1:
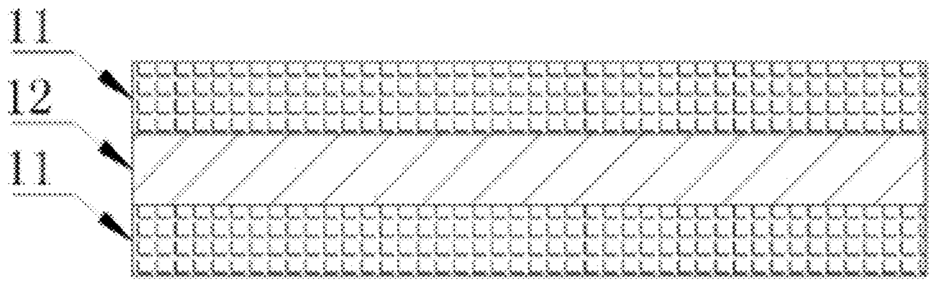
FIG. 1 is a cross-sectional view of a three-layered compound vibrating diaphragm according to an embodiment of the present disclosure.

Detail description on the various exemplary embodiments of the present disclosure will be made below with reference to the drawings. It is to be noted that unless otherwise specified, relative arrangement, digital expression formulae and numerical values of components and steps illustrated in these embodiments do not limit the scope of the present disclosure.

Description to at least one exemplary embodiment is in fact illustrative only, and is in no way limiting to the present disclosure or application or use thereof.

Techniques, methods and devices known to those skilled in the prior art may not be discussed in detail. But in a proper circumstance, the techniques, methods and devices shall be regarded as a part of the description.

In all the illustrated and discussed examples, any specific value shall be explained as be exemplary merely rather than be restrictive. Thus, other examples of exemplary embodiments may have different values.

It is to be noted that similar reference numbers and alphabetical letters represent similar items in the drawings below, such that once a certain item is defined in a drawing, further discussion thereon in the subsequent drawings is no longer necessary.

According to an embodiment of the present disclosure, provided is a vibrating diaphragm of a sound-producing apparatus, wherein the vibrating diaphragm includes a fluorosilicone rubber film layer, and the fluorosilicone rubber includes a linear polymer composed of a silica main chain and a side chain radical;

A molecular structure of the polymer is as follows:

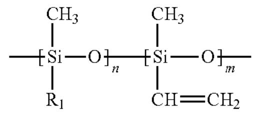

Wherein, a unit with the side chain radical with vinyl is a methyl vinyl siloxane unit, and a unit with the side chain radical with $R_1$ is a fluorine-containing siloxane unit;

And wherein n and m are natural numbers, and $R_1$ includes at least one of fluoroalkyl and fluoroaryl.

The fluorosilicone rubber (FMVQ) is a linear polymer with a silicon oxygen bond as a main chain structure, with fluoroalkyl or fluoroaryl introduced to a side chain. The vibrating diaphragm made of the fluorosilicone rubber has a good resilient characteristic compared with an engineering plastic, and is free from irreversible deformation of the corrugated rim under excessive depression of the vibrating diaphragm. Since the side chain of the molecular chain of the fluorosilicone rubber has fluoroalkyl or fluoroaryl, the fluorosilicone rubber has good hydrophobicity and oil resistivity. The vibrating diaphragm can maintain stable acoustic performance, and is free from failure due to film folding, film breakage, contacting with water, oil, etc.

The fluorosilicone rubber has excellent rebound resilience and oil resistance. The vibrating diaphragm for a micro speaker made of the fluorosilicone rubber can meet the demand of the vibrating diaphragm of the micro speaker on material performance.

In an example, the vibrating diaphragm can be a single-layered vibrating diaphragm.

When the vibrating diaphragm is a single-layered vibrating diaphragm, the vibrating diaphragm is made of the above fluorosilicone rubber.

In an embodiment, the vibrating diaphragm is a compound vibrating diaphragm.

When the vibrating diaphragm is a compound vibrating diaphragm, the compound vibrating diaphragm includes at least one fluorosilicone rubber film layer. The film layers are compounded, bonded and fixed by adhesive layers.

For example, the fluorosilicone rubber can be used for manufacturing the single-layered vibrating diaphragm or the compound vibrating diaphragm, and the compound vibrating diaphragm includes two, three, four or five film layers. Those skilled in the art can select a more preferred number of layers according to actual needs.

FIG. 1 is a cross-sectional view of the three-layered compound vibrating diaphragm, where a middle layer 12 is a fluorosilicone rubber film layer, and upper and lower surfaces of the fluorosilicone rubber film layer are provided with engineering plastic film layers 11.

In an embodiment, $R_1$ includes at least one of γ-trifluoropropyl, pentafluorobutyl, heptafluoropentyl and fluorophenyl.

In the embodiment, these radicals are taken as $R_1$ to form a fluorine-containing siloxane unit on the main chain. Accordingly, the formed fluorosilicone rubber has improved rebound resilience and oil and solvent resistance.

In an embodiment, an amount of methyl vinyl siloxane unit is 0 to 2 mol % of the total amount of the polymer.

In the embodiment, the content of the methyl vinyl siloxane unit is 0 to 2 mol %, calculated based on a proportion of a molar weight m of the methyl vinyl siloxane unit and the molar weight n of the fluorine-containing siloxane unit.

For example, the molar weight of the methyl vinyl siloxane unit is denoted as m and the molar weight of the fluorine-containing siloxane unit is denoted as n. The molar weight m of the methyl vinyl siloxane unit is m=m/(m+n). As the methyl vinyl siloxane unit is within the molar weight range, the fluorosilicone rubber has improved rebound resilience and oil and solvent resistance.

In an embodiment, the fluorosilicone rubber further includes a vulcanizer, and the vulcanizer is at least one of oxide and hydrogen-containing silicone oil.

A vulcanizer is added to the rubber for vulcanization, such that the rubber is subject to a crosslinking reaction, thereby increasing performance of the rubber, for example elasticity, hardness, tensile strength, stable stretching strength and the like. The abovementioned vulcanizer can better increase performance of the rubber, for example elasticity, hardness, tensile strength, stable stretching strength and the like.

In an example, let the mass fraction of the polymer be 100 parts in total, the mass fraction of the added vulcanizer is 0.5 to 10 parts. The vulcanizer is added into the fluorosilicone rubber in this proportion. Performance of the rubber, for example elasticity, hardness, tensile strength, stable stretching strength and the like can be improved.

In an embodiment, the fluorosilicone rubber further includes an inorganic filler reinforcing agent, and the inorganic filler reinforcing agent includes at least one of a carbon black and a white carbon black.

The reinforcing agent included in the fluorosilicone rubber primarily includes carbon black, white carbon black and the like. Along with increase of the added amount of the reinforcing agent, the hardness of the fluorosilicone rubber will be increased therewith. When the content of the reinforcing agent is too high, the elongation at break of the fluorosilicone rubber will be decreased rapidly, such that the vibrating diaphragm tends to break.

For example, when the mass fraction of the polymer is 100 parts, the added amount of the reinforcing agent is 5 to 90 parts, preferably, 5 to 70 parts. Within the above range of added amount, the fluorosilicone rubber has proper hardness, thereby meeting the strength demand of the vibrating diaphragm.

Figure 2:
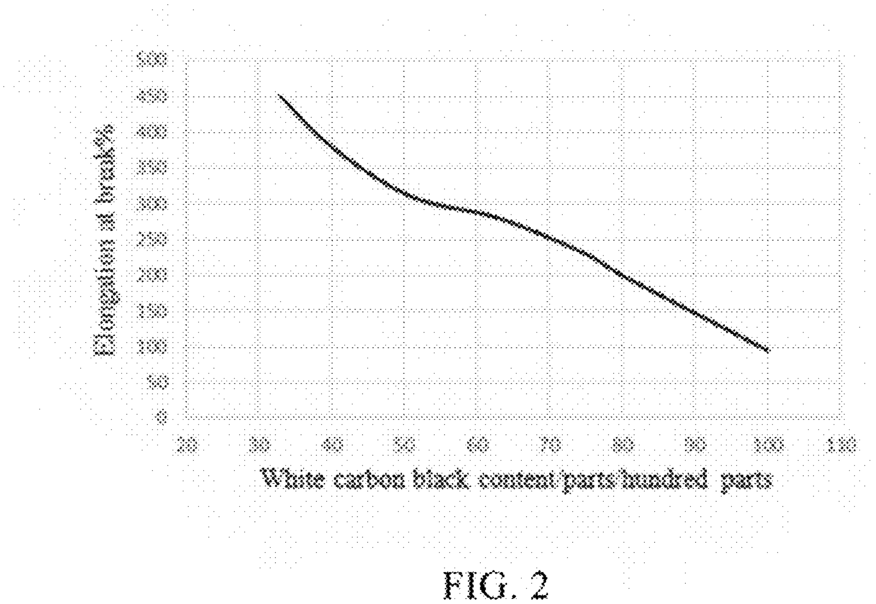
FIG. 2 is a relationship diagram of hardness and elongation at break of the rubber according to an embodiment of the present disclosure.

As shown in the FIG. 2, with increase of added parts of the white carbon black, the hardness of the fluorosilicone rubber is increased and the elongation at break is decreased gradually. In particular, when the mass fraction of the white carbon black is 100 parts, the elongation at break thereof is decreased to 90%; and when the vibrating diaphragm is prepared, the vibrating diaphragm may be at the risk of breakage upon relatively large stress.

In an embodiment, a hardness of the fluorosilicone rubber is 30 A to 85 A, and a 100% stable stretch modulus of the fluorosilicone rubber at room temperature is 0.5 MPa to 50 MPa.

Compared with the engineering plastic, the fluorosilicone rubber has relatively low modulus. The hardness adjusting range of the fluorosilicone rubber can range from 30 A to 85 A, preferably, 30 A to 80 A, by adding the reinforcing agent, 100% stable stretch modulus of the fluorosilicone rubber is in direct proportion to hardness, and the higher the hardness is, the higher the 100% stable stretch modulus is. The adjustable range of the 100% stable stretch modulus at room temperature is 0.5 MPa to 50 MPa, preferably, 1 MPa to 30 MPa.

The higher the 100% stable stretch modulus is, the higher the F0 of the vibrating diaphragm material is. However, when the F0 is too high, the low frequency loudness of the speaker will decrease.

The F0 of the speaker is in direct proportion to the Young modulus and thickness, and change of F0 can be realized by changing the thickness and the Young modulus of the vibrating diaphragm of the speaker. A specific adjusting principle thereof is as follows:

$$F0 = \frac{1}{2\pi}\sqrt{\frac{1}{C_{ms}M_{ms}}}$$

Wherein Mms is equivalent vibrational mass of the speaker and $C_{ms}$ is equivalent compliance of the speaker:

$$C_{ms} = \frac{(C_{m1} * C_{m2})}{(C_{m1} + C_{m2})}$$

Wherein $C_{m1}$ is damper compliance and $C_{m2}$ is vibrating diaphragm compliance. In a design without a damper, the equivalent compliance of the speaker is vibrating diaphragm compliance:

$$C_{m2} = \frac{(1-u^3)W^3}{\pi(W+dvc)t^3 Ea_1 a_2}$$

Wherein W is the total width of a corrugated rim part of the vibrating diaphragm, t is the thickness of the diaphragm, dvc is the fitting outer diameter of a voice coil fitted on the vibrating diaphragm; E is the Young modulus of the vibrating diaphragm material; and u is the Poisson ratio of the material of the vibrating diaphragm.

It can be seen that F0 of the speaker is in direct proportion to the modulus and thickness, and the modulus of the rubber is in direct proportion to the hardness thereof, therefore, F0 can be adjusted by way of adjusting hardness. In order to obtain full low pitch and comfortable hearing feeling, the vibrating diaphragm must have enough rigidity and damping while the speaker has relatively low F0. Those skilled in the art can adjust the amplitude of F0 by adjusting hardness and thickness of the vibrating diaphragm of a speaker.

For example, the hardness is 30 to 80 A. The thickness of the vibrating diaphragm of the speaker is 30 to 120 μm. The adjustable range of F0 of the speaker can reach 150 to 1500 Hz, which meets the requirements on the acoustic performance indices of most speakers.

Figure 3:
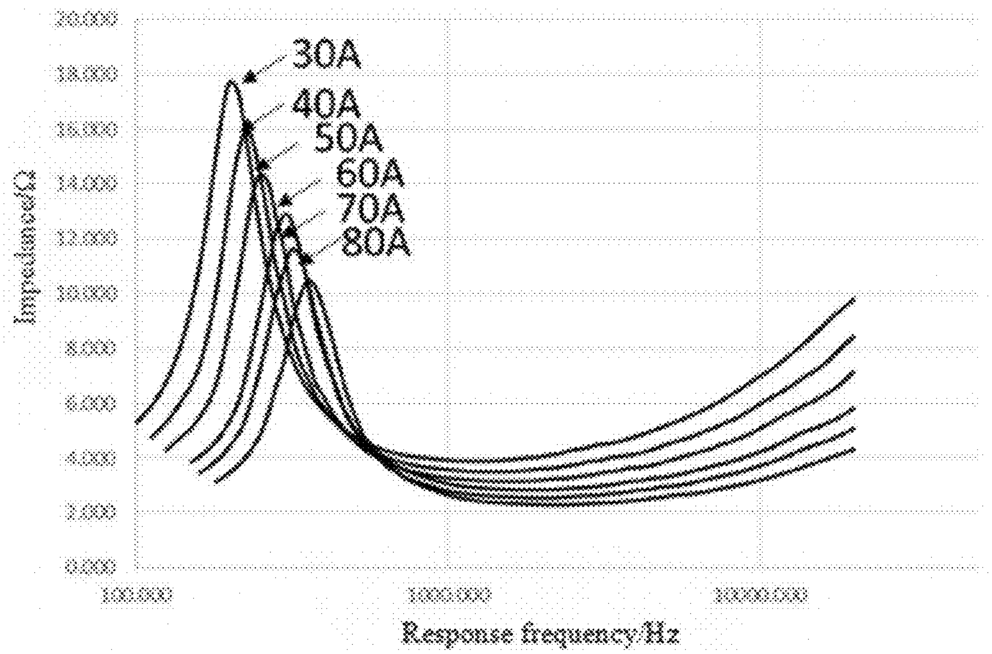
FIG. 3 is an impedance curve graph of fluorosilicone rubber with different hardness according to an embodiment of the present disclosure.

FIG. 3 is an impedance curve of the fluorosilicone rubber vibrating diaphragms with different hardness. It can be seen that the higher the hardness is, the higher the F0 of the vibrating diaphragm is.

In an embodiment, an elongation at break of the fluorosilicone rubber is greater than 50%.

The fluorosilicone rubber has excellent toughness, and optionally, the elongation at break is greater than 50%, such that the reliability problem such as diaphragm breakage is not prone to occur when the vibrating diaphragm is used in a module. Preferably, the elongation at break is greater than 100%. Thus, the vibrating diaphragm has improved toughness.

In the prior art, the engineering plastic has a significant yield point at about 1-5% strain, accordingly, for use with the vibrating diaphragm, the vibrating amplitude of the engineering plastic during vibration must be limited. Once the vibrating amplitude is too large and the strain exceeds the yield point of the engineering plastic, abnormalities such as film folding and film breakage tend to occur at the corrugated rim of the vibrating diaphragm where strain is concentrated. In a water pressure test for waterproof test of electronic products, after pressed by water, the engineering spastic vibrating diaphragm tends to deform at the corrugated rim beyond its yield point, causing irreversible deformation on the corrugated rim and consequently resulting in abnormal sound-producing of the whole product.

Compared with the prior art, the vibrating diaphragm provided in this disclosure is free from yield strain point because the fluorosilicone rubber is within the whole deformation range, and thus the vibrating diaphragm made of the fluorosilicone rubber has good rebound resilience. In the water pressure test for the waterproofness of the electronic product, both the irreversible deformation under water pressure and the problem of film folding are avoided.

Compared with the engineering plastic, the fluorosilicone rubber vibrating diaphragm has good flexibility, for example, the elongation at break of the fluorosilicone rubber vibrating diaphragm is greater than or equal to 100%. This improves the vibration displacement and loudness of the vibrating diaphragm of the speaker, and ensures good reliability and durability of the vibrating diaphragm.

The better the flexibility of the material is, the greater the elongation at break is, and the higher the ability of the vibrating diaphragm resisting damage is. When the vibrating diaphragm of the speaker vibrates by large amplitude, the material generates relative large strain.

Figure 4:
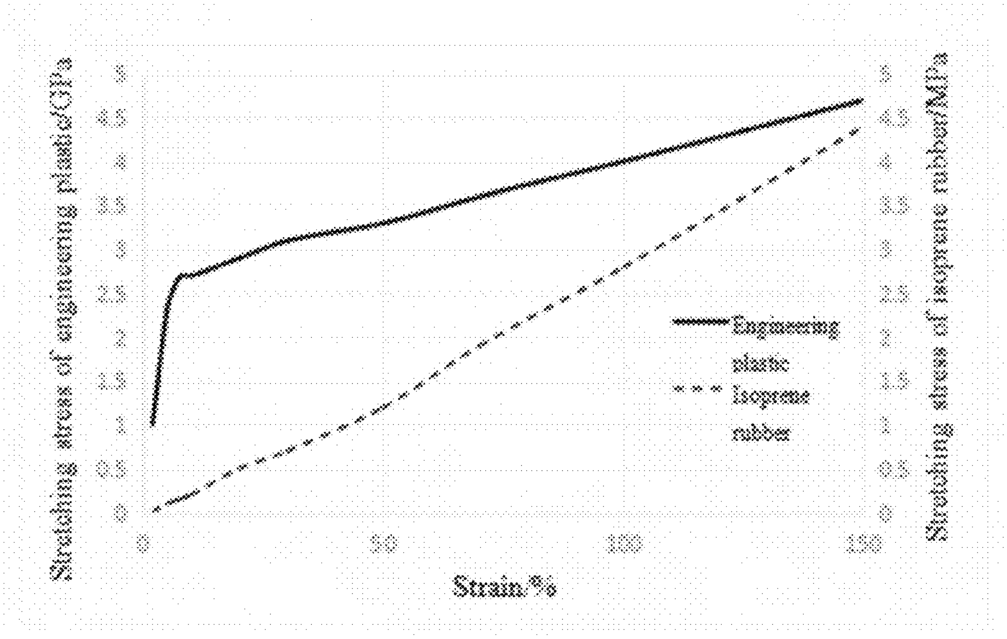
FIG. 4 is a stress-strain curve graph of a vibrating diaphragm of a speaker according to an embodiment of the present disclosure and a conventional vibrating diaphragm.

As shown in the FIG. 4, the engineering plastic tends to exceed the strain range of yield, such that the vibrating diaphragm has abnormalities such as film folding, film rupture or film breakage. The vibrating diaphragm of the speaker taking the fluorosilicone rubber as a base material has good flexibility and rebound resilience within a relatively large strain range, thereby reducing the risk of damaging the vibrating diaphragm.

In the molecular chain of the fluorosilicone rubber, the side chain contains a lot of fluorine-containing radicals, and the fluorine-containing radicals have strong hydrophobicity, such that the fluorosilicone rubber has strong hydrophobicity. The vibrating diaphragm made of the material may have strong hydrophobicity.

In an embodiment, table 1 is a comparison between contact angles of the fluorosilicone rubber film and the PEEK thin film. When the contact angle exceeds 90 degrees, the material medium shows hydrophobicity. The larger the contact angle is, the stronger the hydrophobicity is.

TABLE 1

| Test medium | Contact angle of Peek thin film/° | Contact angle of fluorosilicone rubber/° |
|---|---|---|
| Water | 85 | 120 |

Further, the side chain with a lot of fluorine-containing radicals functions as a good protection to the main chain, such that the fluorosilicone rubber has a good oleophobic characteristic in comparison with the silicone rubber.

Figure 5:
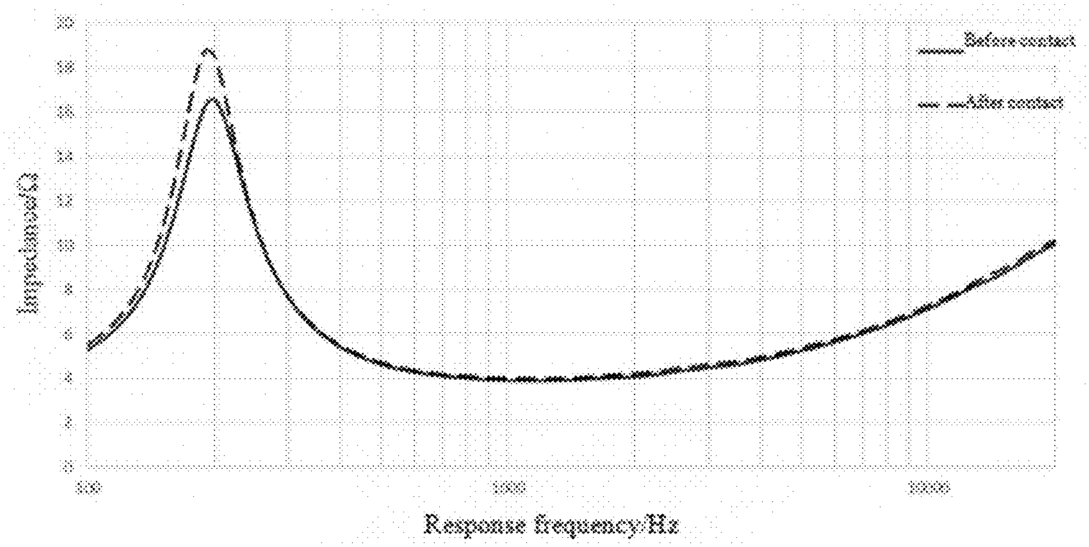
FIG. 5 is a plot of impedance variation of silicone rubber before and after contact with an oily medium.

FIG. 5 is a plot of impedance variation of silicone rubber before and after contact with an oily medium.

Figure 6:
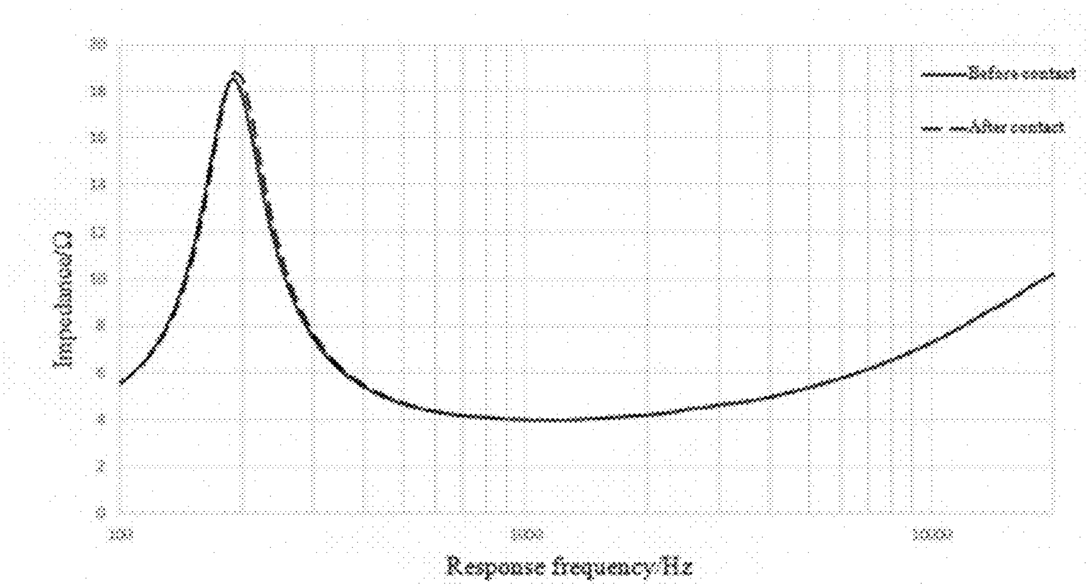
FIG. 6 is a plot of impedance variation of fluorosilicone rubber according to an embodiment of the present disclosure before and after contact with an oily medium.

FIG. 6 is a plot of impedance variation of fluorosilicone rubber before and after contact with an oily medium.

Compared with the dispersed silicone rubber, it can be seen that the fluorosilicone rubber in contact with or even immersed in an oily medium can still maintain stable performance.

The main chain of the molecular chain of the fluorosilicone rubber has relatively large bond energy (425 KJ/Mol) which is greater than that of a typical C—C single bond (345 KJ/Mol). Therefore, the fluorosilicone rubber is more stable on crosslinking, and can maintain stable performance even at high temperature. The vibrating diaphragm made of the fluorosilicone rubber has a higher upper limit on operational temperature. In an environment at 250° C., it can work for three days continuously. It can meet the demand of the speaker on high temperature, and can prevent the problem of structural collapse of the vibrating diaphragm due to overheat from occurring in practical use.

In an embodiment, thermo-oxidative aging resistance of the fluorosilicone rubber is tested.

Table 2 shows variation of hardness of the fluorosilicone rubber under accelerated aging at 200° C. It can be seen that at 200° C., the fluorosilicone rubber is substantially stable in performance within 20 days.

TABLE 2

| Ageing number of days/Day | 0 | 1 | 3 | 5 | 7 | 10 | 20 |
|---|---|---|---|---|---|---|---|
| Hardness/A | 66 | 68 | 71 | 68 | 69 | 68 | 70 |

In an embodiment, the brittle temperature of the fluorosilicone rubber can be as low as −70° C.

The main chain of the molecular chain of the fluorosilicone rubber is a silica main chain, and the molecular chain is flexible and easy to slide, such that the fluorosilicone rubber has relatively low brittle temperature and the brittle temperature is as low as −70° C. Thus, the vibrating diaphragm made of the fluorosilicone rubber can be used for a long time at low temperature.

In an embodiment, the thickness of the vibrating diaphragm is 10 μm to 200 μm. In the range, the vibrating diaphragm has improved performance.

In an embodiment, the vibrating diaphragm is prepared by one of pressure forming, injection molding and blow molding.

The above mentioned preparation method for the vibrating diaphragm has no influence on the acoustic performance of the vibrating diaphragm.

According to another aspect of the present disclosure, a sound-producing apparatus is provided, which includes any one of the vibrating diaphragms described above, the vibrating diaphragm being configured to enable the sound-producing apparatus to generate a sound by vibration.

The sound-producing apparatus further includes a vibration system and a magnetic circuit system, the vibrating diaphragm being arranged in the vibration system. The vibrating diaphragm vibrates to generate a sound by means of interaction between the magnetic circuit system and the vibration system. For example, the sound-producing apparatus is a micro speaker, and the vibrating diaphragm vibrates such that the micro speaker generates a sound. The micro speaker adopting the above vibrating diaphragm has the advantage of the vibrating diaphragms in all the examples.

Although detailed description has been made on some specific embodiments of the present disclosure through examples, those skilled in the art shall understand that the examples are for explanation rather than limitation of the scope of the present disclosure. Those skilled in the art shall understand that modifications on the embodiments can be made without departing from the scope or the spirit of the present disclosure. The scope of the present disclosure is defined by the appended claims.

The invention claimed is:

1. A vibrating diaphragm of a sound-producing apparatus, wherein the vibrating diaphragm comprises a fluorosilicone rubber film layer, and the fluorosilicone rubber comprises a linear polymer composed of a silica main chain and a side chain radical;

the polymer having a molecular structure as follows:

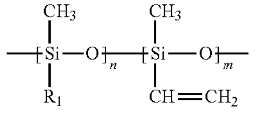

wherein a unit with the side chain radical with vinyl is a methyl vinyl siloxane unit, and a unit with the side chain radical with R1 is a fluorine-containing siloxane unit;

wherein n and m are natural numbers, and R1 comprises at least one of fluoroalkyl and fluoroaryl, and wherein the fluorosilicone rubber further comprises a vulcanizer, and the vulcanizer comprises at least one of an oxide and hydrogen-containing silicone oil.

2. The vibrating diaphragm of claim 1 of a sound-producing apparatus, wherein R1 comprises at least one of γ-trifluoropropyl, pentafluorobutyl, heptafluoropentyl and fluorophenyl.

3. The vibrating diaphragm of claim 1 of a sound-producing apparatus, wherein an amount of the methyl vinyl siloxane unit is no more than 2 mol % of the total amount of the polymer.

4. The vibrating diaphragm of claim 1 of a sound-producing apparatus, wherein the fluorosilicone rubber further comprises an inorganic filler reinforcing agent, and the inorganic filler reinforcing agent comprises at least one of a carbon black and a white carbon black.

5. The vibrating diaphragm of claim 4 of a sound-producing apparatus, wherein an added amount of the inorganic filler reinforcing agent is 5 to 90 parts when a mass fraction of the polymer is 100 parts, a hardness of the fluorosilicone rubber is 30 A to 85 A and a 100% stable stretch modulus of the fluorosilicone rubber at room temperature is 0.5 MPa to 50 MPa.

6. The vibrating diaphragm of claim 1 of a sound-producing apparatus, wherein an elongation at break of the fluorosilicone rubber is greater than 50%.

7. The vibrating diaphragm of claim 1 of a sound-producing apparatus, wherein the vibrating diaphragm is a single-layered vibrating diaphragm.

8. The vibrating diaphragm of claim 1 of a sound-producing apparatus, wherein the vibrating diaphragm is a compound vibrating diaphragm, and the compound vibrating diaphragm comprises at least one fluorosilicone rubber film layer.

9. The vibrating diaphragm of claim 1 of a sound-producing apparatus, wherein a thickness of the vibrating diaphragm is 10 μm to 200 μm.

10. The vibrating diaphragm of claim 1 of a sound-producing apparatus, wherein the vibrating diaphragm is prepared by one of pressure forming, injection molding and blow molding.

11. A sound-producing apparatus, comprising the vibrating diaphragm of claim 1, wherein the vibrating diaphragm is configured to enable the sound-producing apparatus to generate a sound by vibration.

12. The vibrating diaphragm of claim 5 of a sound-producing apparatus, wherein a thickness of the vibrating diaphragm is 30 to 120 μm, and an adjustable range of F0 of the sound-producing apparatus is 150 to 1500 Hz.

* * * * *